(12) United States Patent
Holliman

(10) Patent No.: US 8,739,736 B2
(45) Date of Patent: Jun. 3, 2014

(54) SYSTEMS AND METHODS FOR THE PORTABLE ELECTROANESTHESIA OF FISH

(75) Inventor: Farland Michael Holliman, Vancouver, WA (US)

(73) Assignee: Smith-Root, Inc., Vancouver, WA (US)

(*) Notice: Subject to any disclaimer, the term of this patent is extended or adjusted under 35 U.S.C. 154(b) by 0 days.

(21) Appl. No.: 12/582,579

(22) Filed: Oct. 20, 2009

(65) Prior Publication Data

US 2010/0313820 A1    Dec. 16, 2010

Related U.S. Application Data

(60) Provisional application No. 61/106,908, filed on Oct. 20, 2008.

(51) Int. Cl.
    *A01K 61/00*    (2006.01)

(52) U.S. Cl.
    USPC .......................................................... 119/215

(58) Field of Classification Search
    USPC ........... 119/215, 216, 219, 220; 43/17.1, 17.5
    See application file for complete search history.

(56) References Cited

U.S. PATENT DOCUMENTS

| | | |
|---|---|---|
| 3,110,978 A | 11/1963 | Kreutzer |
| 4,417,301 A | 11/1983 | Newman |
| 4,723,511 A * | 2/1988 | Solman et al. ................ 119/224 |
| 4,750,451 A | 6/1988 | Smith |
| 4,888,703 A * | 12/1989 | Baba et al. ..................... 702/22 |
| 4,963,035 A * | 10/1990 | McCarthy et al. ............ 382/110 |
| 5,111,379 A | 5/1992 | Sharber et al. |
| 5,233,782 A | 8/1993 | Sharber et al. |
| 5,270,912 A | 12/1993 | Sharber |
| 5,305,711 A | 4/1994 | Sharber |
| 5,311,694 A | 5/1994 | Sharber |
| 5,327,668 A | 7/1994 | Sharber |
| 5,327,854 A | 7/1994 | Smith |
| 5,341,764 A | 8/1994 | Sharber |
| 5,445,111 A | 8/1995 | Smith |
| 5,460,123 A * | 10/1995 | Kolz ............................. 119/220 |
| 5,551,377 A | 9/1996 | Sharber |
| 6,132,303 A * | 10/2000 | Buckhaven ..................... 452/59 |
| 6,978,734 B1 | 12/2005 | Smith |
| 2009/0035220 A1* | 2/2009 | Jones ............................ 424/9.2 |

FOREIGN PATENT DOCUMENTS

| | | | |
|---|---|---|---|
| DE | 2321646 A | * 11/1974 | |
| GB | 2201772 A | * 9/1988 | ............ G01B 11/04 |

* cited by examiner

*Primary Examiner* — Rob Swiatek
*Assistant Examiner* — Danielle Clerkley
(74) *Attorney, Agent, or Firm* — J. Curtis Edmondson; Law Offices of J. Curtis Edmondson

(57) ABSTRACT

A portable fish anesthetizing system is also described having a tank cover, an electrode pair with the electrode pair configurable attached to the tank cover; a control system for creating a potential difference, the control system electrically connected to the electrode pair, so that when the tank cover is placed on a laboratory tank and the control system is activated, current flows from the control system through the electrodes.

12 Claims, 3 Drawing Sheets

SYSTEMS AND METHODS FOR THE PORTABLE ELECTROANESTHESIA OF FISH

RELATED APPLICATIONS

This application claims the benefit of U.S. Provisional Application No. 61/106,908; filed Oct. 20, 2008, the contents herein incorporated into this application by reference.

BACKGROUND

The present inventive subject matter relates to stunning and/or euthanization of laboratory fish using electric currents and the monitoring of the laboratory fish to prevent injury thereof.

Electrofishing involves the use of electric currents to attract and/or repel fish with the intent of creating aquatic barriers and/or to increase collection yields. It has been established that relatively small potentials that are impressed across the body of a fish invoke a flight reaction. Larger potentials result in the alignment of the fish with the electric current, or electrotaxis. Still larger potentials may result in electronarcosis and/or the complete euthanasia (e.g. tetany) of the fish. (See Introduction to Electrofishing, pages 24-26, Smith-Root, Inc. which is incorporated herein by reference).

Electrofishing has traditionally been used in freshwater lakes and streams and is the subject of U.S. Pat. Nos. 5,445,111; 5,327,854; 4,750,451; 4,672,967; 4,713,315; 5,111,379; 5,233,782; 5,270,912; 5,305,711; 5,311,694; 5,327,668; 5,341,764; 5,551,377; and 6,978,734 which are incorporated herein by reference. Also, electrofishing has been the used to stimulate yields of trawl net fishing as described in U.S. Pat. Nos. 3,110,978 and 4,417,301 which are also incorporated herein by reference. Furthermore, certain systems for controlling electricity in aquatic environments have been described in U.S. Pat. No. 5,460,123 which is incorporated herein by reference.

Also systems for monitoring small laboratory fish are described in U.S. Patent Publication 2006/0018833 which is incorporated herein by reference.

As is clear from the prior art, there is a considerable body of work associated with the electrification of large bodies of water to impress electric fields across larger fish, such as Salmon or Trout, as compared to smaller fish, which are typically found in a laboratory.

Prior art solutions and techniques that induce narcosis in fish include the addition of chemicals to the tank. The addition of chemicals to the tank water may make the fish temporarily motionless, but, such chemicals are expensive to use, may be toxic to the fish and/or the researcher, and may also interfere with experiment itself. Also, the use of chemicals to induce fish tenany may be unnecessarily complex and expensive requiring the training of specialized personnel. Other means of inducing fish euthanasia has been through the injection (e.g. bubbling) of carbon dioxide gas in a tank holding the target fish.

In certain situations, the experimenter may also wish to induce euthanasia in fish that reside in small bodies of water and/or laboratory tanks. Euthanasia should be induced in a manner to reduce any amount of pain to the fish.

It is also understood that the laboratory fish may have high commercial value as consequence of unique breeding, for example, the fish may be bred to with certain genetic abnormalities that are important to certain laboratory tests. The inadvertent death of these fish, as opposed to their temporary anesthesia, may deprive the research of important benefits.

Therefore, there is a need to have a portable unit that can euthanize with relatively low voltages. This portable unit not only has the aforementioned advantage of eliminating chemicals, but it also reduces the risk to the experimenter who may come into contact with the water and/or the operational electrodes.

There is also a need to have a portable unit that can euthanize with relatively low voltages that are species specific and/or test subject specific so that the Therefore there is also a need to have a monitoring system to insure that a laboratory fish does not come into contact with an anode or a cathode to prevent potentially injurious shock.

Furthermore one of the problems encountered with the use of constant direct current (DC) fields is that a deposition layer appears on one of the electrodes. This deposition layer increases the resistance of the electrode during use which decreases its effectiveness. Therefore, it is desired to have a unit that minimizes the deposition layer on either of the electrodes during operation.

Therefore, what is desired is an apparatus to immobilize fish and place the fish in the states of narcosis, tetany, and/or euthanasia. It is also desired that this apparatus operate at relatively low voltage levels. It is also desired that the apparatus reduce the amount of deposition on either of the electrodes during operation.

SUMMARY

The present inventive subject matter overcomes problems in the prior art by providing a fish anesthetizing apparatus that induces a potential field across the body of a laboratory fish comprising, a programmable power supply, the programmable power supply having a first output terminal and a second output terminal, a pair of electrodes, the first electrode connected to the first output terminal and the second electrode connected to the second output terminal; whereby when the pair of electrodes are inserted in the enclosed body of water, a potential field is created by the programmable power supply so that two electrodes inducing an altered stated in a laboratory fish.

The programmable power supply wherein the potential difference between the first electrode and the second electrode is an impulse signal.

The programmable power supply wherein the potential difference between the first electrode and the second electrode creates a field that induces electronarcosis in a laboratory fish.

The programmable power supply wherein the potential difference between the first electrode and the second electrode creates a field that induces electrotaxis in a laboratory fish.

A fish anesthetizing apparatus that induces an electric field across a fish comprising: a programmable power supply, an anode and a cathode, the anode and cathode capable of immersion water and so that when the anode and cathode are immersed in water, a potential difference is generated across a laboratory fish, such that the fish experiences a physiological change.

The apparatus where the potential difference is a periodic waveform with a period ranging from a low voltage to 100 volts in 1 second.

The apparatus where the potential difference is a periodic waveform with a period 100 Volt Pulse at 30 Hz w/25% duty cycle.

The apparatus where the potential difference is a periodic waveform with a 100 Volt Pulse at 15 Hz w/25% duty cycle.

The apparatus where the potential difference is a periodic waveform with a 100 Volt Pulse at 95 Hz w/25% duty cycle.

The apparatus where the potential difference is a periodic waveform with a 100 Volt Pulse at 100 Hz w/25% duty cycle.

The apparatus where the potential difference is a periodic waveform with a Burst of 3 100 Volt Pulses at 250 Hz with 62% duty at 15 Hz The apparatus where the potential difference is a periodic waveform with a Burst of 3 100 Volt Pulses at 500 Hz with 62% duty at 15 Hz The apparatus where the potential difference is a periodic waveform with a Burst of 3 100 Volt Pulses at 500 Hz with 62% duty at 15 Hz The apparatus where the potential difference is a periodic waveform with a Burst of 3 100 Volt Pulses of 250 Hz with 62% duty at 15 Hz for 2 seconds followed by a Burst of 3 50 Volt pulses of 250 Hz with 62% duty at 15 Hz for 1 second.

The apparatus where the cyclic waveform further comprises a square wave.

The apparatus wherein the amount of the power generated in the positive phase and the negative phase are approximately equal.

The apparatus where the potential difference is an impulse waveform.

The apparatus where the maximum potential difference ranges from 0 V to 200 V such that electronarcosis is induced in a fish.

The system where in the maximum potential difference ranges from 0 V to 200 V such that electrotaxis is induced in a fish.

A method for inducing an electrical potential across a laboratory fish, the method consisting of obtaining a programmable power supply connecting an anode and a cathode to the programmable power supply, inserting the anode and the cathode into a fish tank, increasing the potential difference between the anode and the cathode so that there is a potential difference of up to 10V/cm across the body of the fish decreasing the potential difference between the anode and the cathode to approximately 0V/cm across the body of the fish; so that when the potential difference first increases and then decreases across the body of the fish, the fish experiences a physiological change.

The method where the potential difference between the anode and cathode is increased and decreased in a cyclic manner.

The method where the potential difference between the anode and the cathode is increased A system for impressing a voltage across a laboratory fish, the system comprising; a means for generating a voltage a means for introducing the voltage into a laboratory tank, so that when the voltage is generated a potential difference is created across the laboratory fish that ranges from 0 to 10 Vdc/cm.

The system for impressing a voltage across a laboratory fish, wherein the system further comprise a means for detecting the type of laboratory fish in the laboratory tank, and a further means for controlling the voltage to induce a state in the laboratory fish, the state of selected from the group consisting of electronarcosis, electrotaxis, or anesthesia.

A portable fish anesthetizing system comprising: a tank cover, an electrode pair, the electrode pair configurable attached to the tank cover; a control system for creating a potential difference, the control system electrically connected to the electrode pair, so that when the tank cover is placed on a laboratory tank and the control system is activated, current flows from the control system through the electrodes.

The portable fish anesthetizing system wherein the tank cover further comprises: a top part and a bottom part, the bottom part being mateable to the top rim of the laboratory tank, wherein the bottom part is adjustable in the either the lengthwise or widthwise dimension so that it may conform to the top of the laboratory tank. The portable fish anesthetizing system where the tank cover further control system further comprises a camera, wherein when the camera is connected to the control system, a series of fish images are recorded from fish in the tank, the control system then identifies a class of fish, and in response to the class of fish detected, adjusts the current flow; so that the fish experiences electronarcosis, electrotaxis, and/or euthanasia.

The portable fish anesthetizing system where the control system further comprises a camera, wherein when the camera is connected to the control system, a series of fish images are recorded from fish in the tank, the control system then identifies a the type of fish subject, and in response to the type of fish subject detected, adjusts the current flow so that the fish experiences electronarcosis, electrotaxis, and/or euthanasia.

These and other embodiments are described in more detail in the following detailed descriptions and the figures.

The foregoing is not intended to be an exhaustive list of embodiments and features of the present inventive subject matter. Persons skilled in the art are capable of appreciating other embodiments and features from the following detailed description in conjunction with the drawings.

DETAILED DESCRIPTION

Figure 1:
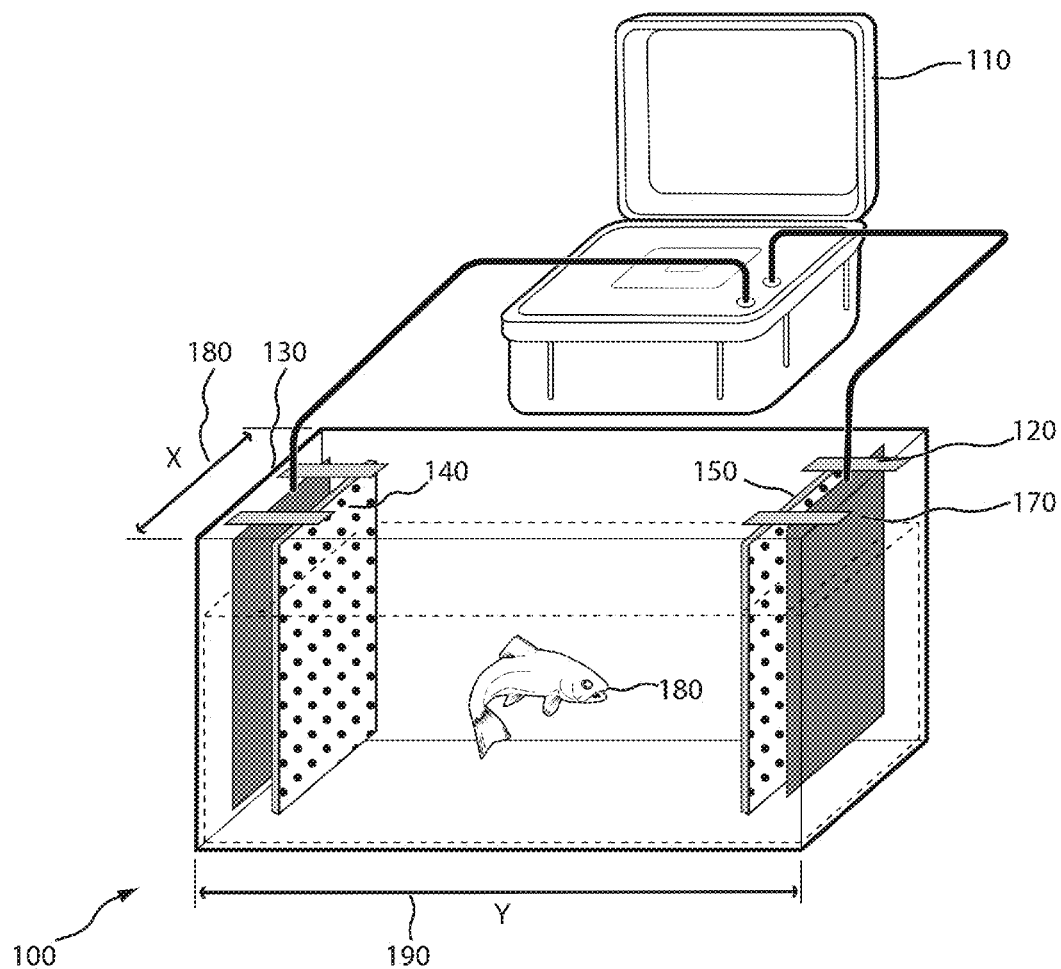
FIG. 1 is a diagram of the portable electroanesthesia system.
Figure 2:
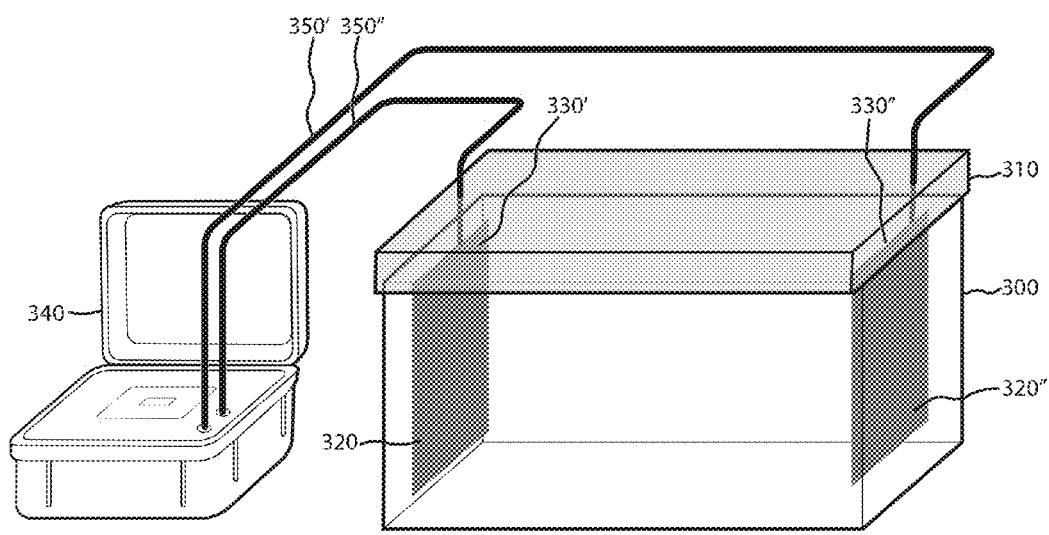
FIG. 2 is a diagram of the portable electroanesthia system with the adjustable cover.
Figure 3:
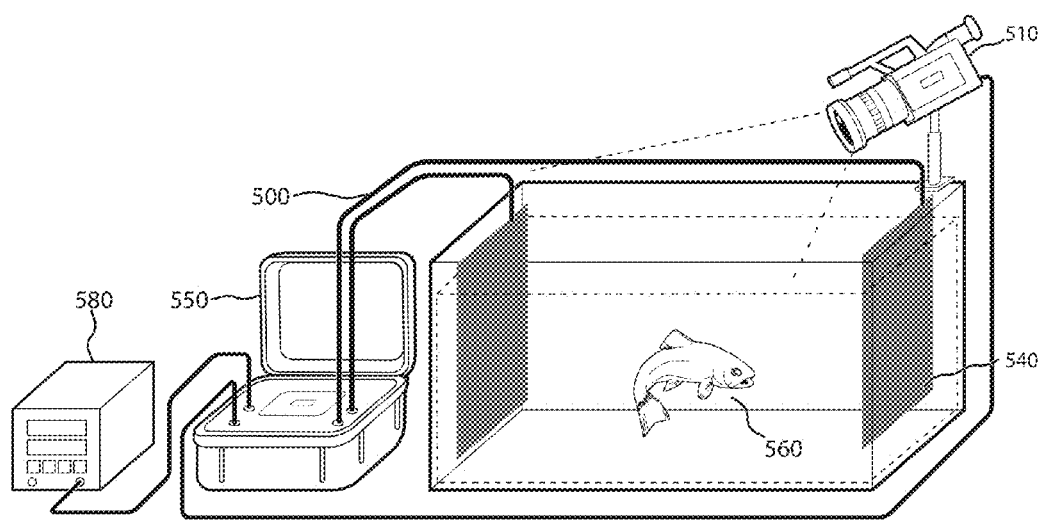
FIG. 3 is a diagram of the portable electroanesthia system with the camera monitoring system

Representative embodiments according to the inventive subject matter are shown in FIGS. 1-3, wherein similar features share common reference numerals.

The term "fish" refers to experimental fish used in a laboratory setting, which include, but are not limited to zebrafish. These fish typically belong to, but are not limited to, the taxa group Telostei or Teleostomi. The teleost fish include such fish as zebrafish (*Danio rerio*), medaka (*Oryzias*, sp.), fathead minnow (*Pinephales promelas*), or goldfish (*Carassius auratus*). It is well established that fish have a typical response to electrical fields applied in the water, although each individual fish and each type of species may have a varying response.

The term "tank" is generally known to those in the arts as a water tank, the preferred embodiment being a 10-40 gallon tank used by researchers that customarily sets on a laboratory top. Tank can also include larger tanks including outdoor tanks and naturally occurring ponds and streams. Also, the characteristics of the water should not be limited to freshwater, but, may also include water of differing salinities including sea water.

The term "electrical stimulation" refers to an electrical field impressed on the tissue of a fish in water. This electrical field will have a range in values that is dependent on the age and species of the fish.

The term "programmable voltage supply" shall mean a device that can output a range of voltages and currents in a waveform that is programmed either by hardwire switch (e.g., a pulse generator) or by software (e.g. a computer controlled voltage generator).

Now referring to FIG. 1, a system 100 is shown for the anesthetizing fish. The system 100 has a water tank 170, two electrodes 120, 130 immersed in the water tank 110, which are connected to the connected to the portable electroanethesia system. The water in the water tank is filled to the water level 170. The electrodes 120, 130 are typically immersed below the water level 170. When voltage is applied across the two electrodes 120,130 a voltage gradient is impressed across the fish 180. Depending on the size of the voltage gradient induced in the fish will determine the effect on the fish.

To anesthetize the fish 180, (electronarcosis), a voltage gradient of about 0.1 to 10 v/cm should be induced across the fish 180. To induce paralysis in the fish (electrotaxis) a voltage gradient of 0.1 to 10v/cm should be induced across the body of the fish. To euthanize the fish 180, a voltage gradient of 0.1 to 10 v/cm or greater should be induced across the body of the fish 180. The voltage gradients needed for electronarcosis, electrotaxis, and euthanasia vary from fish species to fish species, and of course, differ based on the individual physiology of each fish.

In the laboratory setting, the water tank will usually have dimensions of 2 feet in width, 4 feet in length, and 2 feet in height, holding the total water volume of 8 cubic feet or approximately 10 gallons. One type of tank is an Igloo or Coleman insulated type cooler that is commonly available to hold cold beverages which ranges from 40 to 60 qts in volume. Use of this type of tank provides a research with a small volume in which to contain fish and also provide the necessary insulation while the electric field is being applied.

As previously mentioned, a fish typically used in biological studies is the zebrafish. Mature zebrafish grow to a size of approximately 6.4 cm. Juvenile zebrafish, which are more commonly used in research, range in size from approximately 0.9 to 1.5 cm.

The voltage potential varies as a matter of time and may be positive or negative on either electrode. The voltage potential alternates in a manner such there is an equal balance of energy of time between the electrodes.

Now referring to FIG. 3. FIG. 3 shows a block diagram 200 of the portable electroanesthesia system. The charger 210 is connected to an internal battery 220. A DC-DC converter 230 draws power form the battery 220. The output from the DC-DC converter is modified by the programmable DC control 240. The output of the programmable DC control 240 is a modifiable DC waveform.

Now referring to a modifiable DC waveform as described in FIG. 2-10 and as generated by programmable DC control 240. The types of waveforms are:
0) Ramp Voltage from a low voltage to 100 voltage in 1 second
1) 100 Volt Pulse at 30 Hz w/25% duty cycle
2) 100 Volt Pulse at 60 Hz w/25% duty cycle
3) 100 Volt Pulse at 15 Hz w/25% duty cycle
4) 100 Volt Pulse at 95 Hz w/25% duty cycle
5) 100 Volt Pulse at 100 Hz w/25% duty cycle
6) Burst of 3 100 Volt Pulses at 250 Hz with 62% duty at 15 Hz
7) Burst of 3 100 Volt Pulses at 500 Hz with 62% duty at 30 Hz
8) Burst of 3 50 Volt Pulses of 250 Hz with 62 duty at 15 Hz or 1 second followed a burst of 3 100 volt pulses of 250 Hz with a 62% duty at 15 Hz for 2 seconds.
9) Burst of 3 100 Volt Pulses of 250 Hz with 62% duty at 15 Hz for 2 seconds followed by a Burst of 3 50 Volt pulses of 250 Hz with 62% duty at 15 Hz for 1 second.

Persons skilled in the art will recognize that there are a wide variety of databases that can used to store the signal patterns, including, but not limited to SQL databases, text databases, or object oriented databases. Persons skilled in the art will recognize that there are a wide variety of generic programmable voltage supplies, including, but not limited to products manufactured by Lamda (Neptune, N.J., USA). It is also understood by those skilled in the art that the database and/or the programmable power supply may be implemented in firmware in a manner to reduce and/or minimize costs.

Now referring to FIG. 2. FIG. 2 depicts a portable fish anesthetizing system 300 comprising: a tank cover 310, an electrode pair 320', 320", the electrode pair configurable attached to the tank cover 330', 330"; a control system for creating a potential difference 340, the control system electrically connected to the electrode pair 350', 350". When the tank cover 310 is placed on a laboratory tank and the control system is activated, current flows from the control system through the electrodes. The tank cover 310 may be integrated with an interlock switch (not shown) that prevents current from flow unless the tank cover is fully placed on the rim of the tank. The tank cover may also be adjustable, sich that there is a top part and a bottom part, the bottom part of the tank cover can be placed on the the top rim of the laboratory tank. Likewise, the bottom part of the laboratory tank cover is also adjustable in the either the lengthwise or widthwise dimension so that it may conform to the top rim of the laboratory tank.

Now referring to FIG. 3 which shows a portable fish anesthetizing system 500 that has a camera 510. The camera 510 has an optical view 520 of the fish 560 located in the tank 530. The camera 520 is further connected 540 to a control system 550 which collects a series of fish images that is stored in a database 580. These fish images 580 can be analyzed in part or in whole to identify a particular species or class of fish. Based on the species or class of fish and the dimensions of the fish, the current is adjusted and/or waveforms are adjusted to put the fish into a state of electronarcosis, electrotaxis, and/or euthanasia.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

All patent and non-patent literature cited herein is hereby incorporated by references in its entirety for all purposes.

The invention claimed is:
1. A portable fish anesthetizing system comprising:
a tank cover,
an electrode pair, the electrode pair directly mechanically attached to the tank cover;
a control system for creating a potential difference, the control system electrically connected to the electrode pair;
a laboratory tank, the laboratory tank having a top rim, a bottom, and four upward walls connected to the bottom;
a camera removably positioned on at least one of the upward walls, the camera connected to the control system; so that when the camera is connected to the control system, a series of fish images are recorded in the tank, the control system then identifies a class of fish, and in response to the class of fish detected, thereby adjusts a current flow;

wherein activation of the current flow from the control system through the electrode pair creating a potential difference, occurs upon placement of the tank cover on the top rim of the laboratory tank, so that the fish experiences a physiological response; wherein the physiological response is at least one of electronarcosis, electrotaxis, and euthanasia.

2. The portable fish anesthetizing system as in claim 1 wherein the laboratory tank has a volume that can hold from about 40 to about 60 quarts.

3. The portable fish anesthetizing system as in claim 1 wherein the laboratory tank has dimensions of approximately 2 feet in width, 4 feet in length, and 2 feet in height.

4. The portable fish anesthetizing system as in claim 1 wherein the potential difference between the electrode pair creates a field that induces electronarcosis in a laboratory fish.

5. The portable fish anesthetizing system as in claim 1 wherein the potential difference between the electrode pair creates a potential field that induces electrotaxis in laboratory fish.

6. The portable fish anesthetizing system as in claim 1 where the potential difference is a periodic waveform selected from a group consisting of:

(1) 100 Volt Pulse at 30 Hz with 25% duty cycle,
(2) 100 Volt Pulse at 60 Hz with 25% duty cycle,
(3) 100 Volt Pulse at 15 Hz with 25% duty cycle,
(4) 100 Volt Pulse at 95 Hz with 25% duty cycle,
(5) 100 Volt Pulse at 100 Hz with 25% duty cycle,
(6) burst of 3 100 Volt Pulses at 250 Hz with 62% duty cycle at 15 Hz,
(7) burst of 3 100 Volt Pulses at 500 Hz with 62% duty cycle at 30 Hz,
(8) burst of 3 50 Volt Pulses at 250 Hz with 62 duty at 15 Hz or 1 second followed by a burst of 3 100 volt pulses of 250 Hz with a 62% duty at 15 Hz for 2 seconds,
(9) burst of 3, 100 Volt Pulses at 250 Hz with 62% duty cycle at 15 Hz for 2 seconds followed by a burst of 3 50 Volt pulses of 250 Hz with 62% duty at 15 Hz for 1 second.

7. The portable fish anesthetizing system as in claim 6 where the periodic waveform is a square wave.

8. The portable fish anesthetizing system as in claim 6 wherein the periodic waveform has a positive phase and a negative phase, and wherein an amount of power generated in the positive phase and the negative phase are approximately equal.

9. The portable fish anesthetizing system as in claim 6 where the potential difference ranges from 0 V to 200 V such that electronarcosis is induced in a laboratory fish.

10. The portable fish anesthetizing system as in claim 9 where the laboratory fish is a zebrafish.

11. The portable fish anesthetizing system as in claim 1 where the maximum potential difference ranges from 0 V to 200 V such that electrotaxis is induced in a laboratory fish.

12. The portable fish anesthetizing system as in claim 11 where the laboratory fish is a zebrafish.

* * * * *